April 7, 1959 E. H. LAND ET AL 2,880,658
PHOTOGRAPHIC APPARATUS
Filed Jan. 28, 1957 5 Sheets-Sheet 1

Edwin H. Land
Vaito K. Eloranta
and
Murry N. Fairbank
INVENTORS

BY Brown and Mikulka
and
Robert E. Corb

ATTORNEYS

INVENTORS
Edwin H. Land
Vaito K. Eloranta and
BY Murry N. Fairbank
Brown and Mikulka
and
Robert E. Corb
ATTORNEYS April 7, 1959 E. H. LAND ET AL 2,880,658
PHOTOGRAPHIC APPARATUS
Filed Jan. 28, 1957 5 Sheets-Sheet 3

INVENTORS
Edwin H. Land
Vaito K. Eloranta and
BY Murry N. Fairbank
Brown and Mikulka
Robert E. Coit
ATTORNEYS April 7, 1959 E. H. LAND ET AL 2,880,658
PHOTOGRAPHIC APPARATUS Filed Jan. 28, 1957 5 Sheets-Sheet 4

April 7, 1959 E. H. LAND ET AL 2,880,658
PHOTOGRAPHIC APPARATUS
Filed Jan. 28, 1957 5 Sheets-Sheet 5
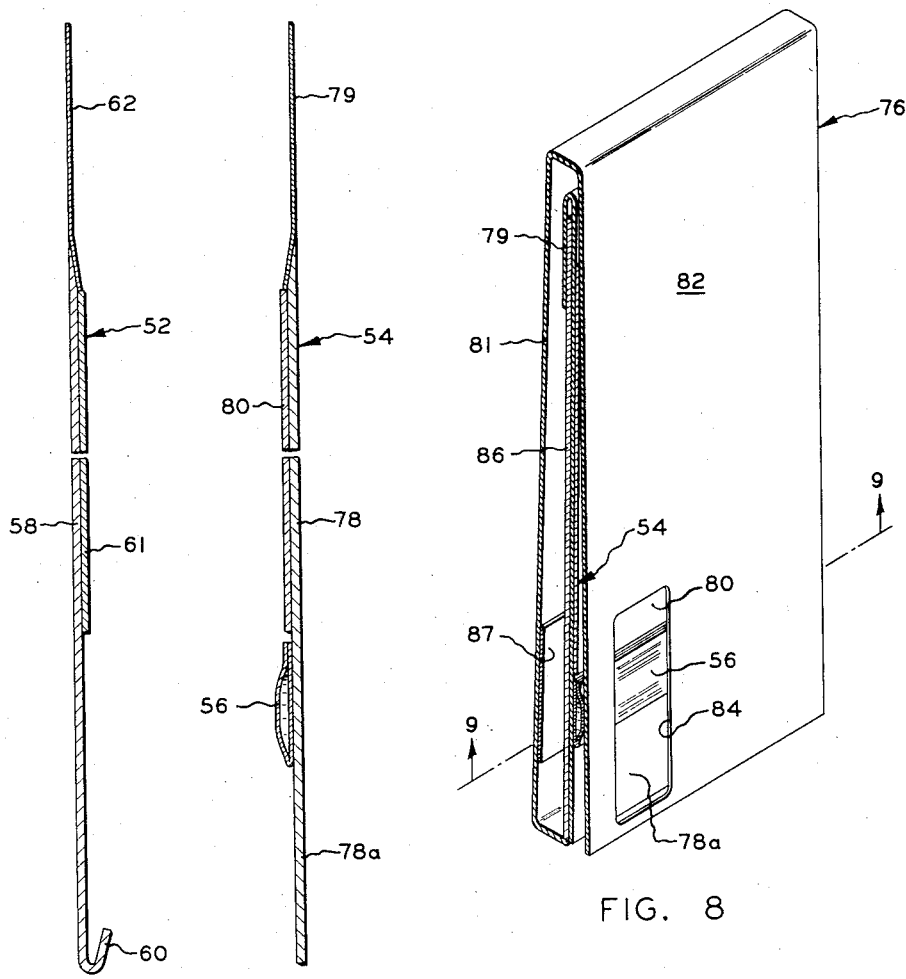
FIG. 10  FIG. 11  FIG. 8
FIG. 9
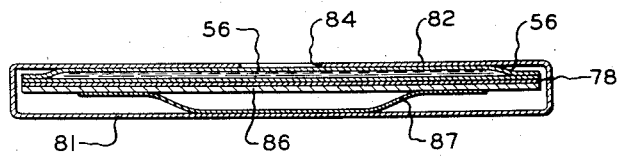
INVENTORS
BY
ATTORNEYS United States Patent Office 2,880,658
Patented Apr. 7, 1959

2,880,658

PHOTOGRAPHIC APPARATUS

Edwin H. Land, Cambridge, Vaito K. Eloranta, Needham, and Murry N. Fairbank, Belmont, Mass., assignors to Polaroid Corporation, Cambridge, Mass., a corporation of Delaware Application January 28, 1957, Serial No. 636,580

30 Claims. (Cl. 95—13)

This invention relates to photographic apparatus, particularly in the form of cameras, for exposing and processing photosensitive sheet materials.

The apparatus of the invention is in the form of a camera wherein at least two sheets, one of which is photosensitive, are spaced apart from one another during exposure of the photosensitive sheet and are thereafter superposed and a fluid reagent is distributed therebetween for processing the photosensitive sheet preferably to produce a positive photographic print. In my copending application Serial No. 636,624, filed January 28, 1957, there is described a camera of this general type characterized by its compactness and small overall size relative to image size. The camera is of the folding type, comprising two relatively movable front and rear housing sections secured to one another and connected by a collapsible bellows. The rear housing section comprises means for positioning a photosensitive sheet for exposure and the front housing section includes a novel lens and shutter assembly and means for locating a second sheet apart from the photosensitive sheet during exposure of the latter. The camera is adapted to be employed with film units each comprising a first photosensitive sheet, a second or image-receiving sheet secured in superposition therewith, and means containing a fluid processing reagent and, accordingly, includes means permitting the introduction of a film unit into the camera, means for separating the first and second sheets of a film unit as it is introduced, and means for superposing the two sheets and distributing the fluid processing reagent therebetween as they are withdrawn from the camera. The camera is essentially a single exposure camera wherein a separate film unit is introduced prior to, and withdrawn following, each exposure.

The present invention has, as an object, the provision of a novel folding camera similar in many respects to the above described type of camera in that it is compact, of a small overall size relative to image size, simply constructed and easily operated, and includes means whereby a plurality of photosensitive sheets are stored and positioned for exposure, an equal number of second sheets are stored and each is superposed with one of said photosensitive sheets following exposure of the latter, and a fluid processing reagent is distributed between the superposed sheets.

Another object of the invention is to provide a camera as described wherein supplies of said photosensitive and second sheets are arranged in stacked relation and spaced apart from one another with the foremost one of said photosensitive sheets located in position for exposure, and wherein folding of said camera is effective to automatically advance at least portions of said foremost photosensitive sheet and the rearmost second sheet into superposition and from said camera to provide leaders whereby said sheets may be manually withdrawn from said camera and a fluid processing reagent distributed between the superposed sheets.

A further object of the invention is to provide a camera as described including a passage through which said sheets are withdrawn, a pair of pressure-applying members located within said passage between which said sheets are advanced in superposition for spreading a fluid processing reagent in a thin layer therebetween, two relatively movable housing sections within which supplies of said sheets are stored in stacked relation, and means within one of said housing sections for engaging the rearmost sheet of the stack of said second sheets and feeding a portion of said rearmost second sheet into engagement with the foremost photosensitive sheet and feeding both said sheets between said pressure-applying members from said camera in response to relative movement of the sections of said camera into folded position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 8 is a perspective view, partially in section, of one part of the film pack of Fig. 7;

Fig. 9 is a sectional view taken along the line 9—9 of Fig. 8; and

Figs. 10 and 11 are sectional views of photographic elements contained in the film pack.

Figures 1, 2:
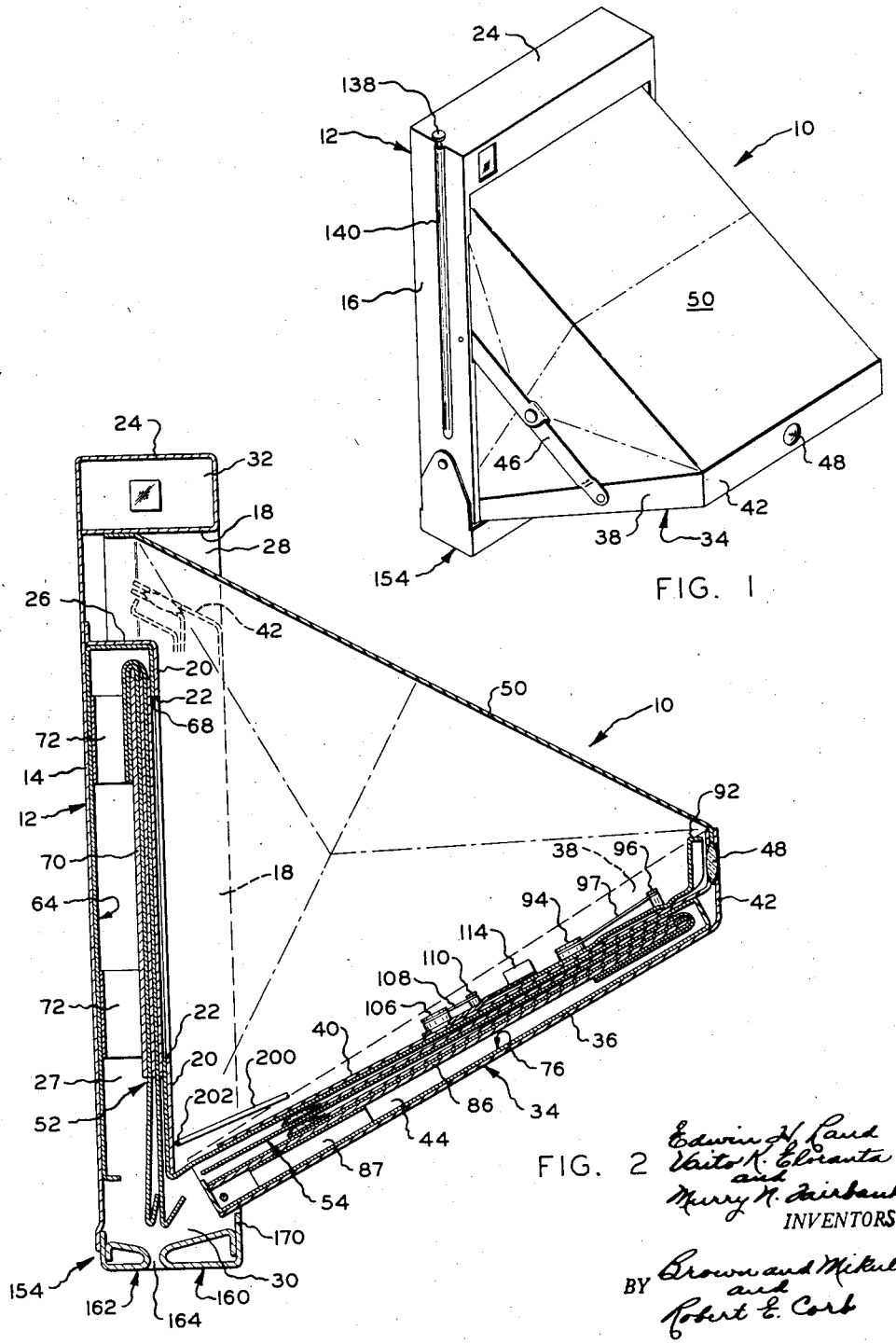
Figure 1 is a perspective view of photographic apparatus in the form of a camera embodying the present invention.
Fig. 2 is a somewhat diagrammatic sectional view taken substantially midway through the sides of the camera of Fig. 1.

A number of forms of cameras of the so-called self-developing type have been proposed wherein a plurality of film units, each comprising a photosensitive sheet and a second sheet, are positioned within the camera with the photosensitive sheets arranged in stacked relation and apart from the second sheets, also arranged in stacked relation. Following exposure of each photosensitive sheet, it is superposed with a second sheet and a fluid processing reagent is distributed in a layer between the sheets. In general, these cameras, whether of the box type or folding type, have been rather large and bulky in relation to the image size or the size of the picture produced. This bulk is the result of the inclusion in the camera of not only the components found in conventional cameras but additional elements special to this type of camera and including, for example, means for storing the sheets of two or more pairs of sheets apart from one another, means for superposing the sheets of each pair following the exposure of one of said sheets and distributing a fluid processing reagent therebetween, means for feeding and moving the sheets through and/or from the camera including means for controlling the movement of the sheets, and means for providing the fluid reagents for distribution between the sheets. The present invention, however, contemplates a camera construction characterized by its compactness, small size relative to image size, simplicity of construction, and ease of operation, made possible by a novel combination, construction and arrangement of the components of the camera.

Generally, the camera of the invention is a folding camera comprising two relatively movable housing sections, one a forward section mounting a lens and shutter and the other a rear section providing means for locating a supply of photosensitive sheets arranged in stacked relation with the foremost sheet located in position for exposure at the focal surface of the lens. The two housing sections are pivotally secured to one another adjacent one end of the forward section and are joined by collapsible bellows which, when the forward section is unfolded to an oblique angle with respect to the rear section, cooperates with the forward section to provide a light path between the lens and shutter on the forward section and a photosensitive sheet positioned for exposure in the rear section. The forward section is constructed so as to enclose a plurality of second sheets arranged in stacked relation and includes novel means for engaging the rearmost second sheet and moving said sheet into engagement with the foremost photosensitive sheet in response to relative movement of the two housing sections into folded position whereby end portions of the two sheets are fed from the camera so that they may be manually grasped for withdrawing them completely from the camera. The construction of the two sections, shutter mechanism and sheet-feeding mechanism is such that, when the two sections are folded together, the camera is very compact, being only slightly larger in width and length than the picture size and being only slightly thicker than the thickness of the combined stacks of photosensitive and second sheets.

The camera of the invention is intended to be employed with a plurality of film units, each comprising a photosensitive sheet, a second sheet and a container preferably associated with the second sheet and carrying a fluid processing reagent. The photosensitive sheets of a plurality of the film units are arranged in stacked relation and the second sheets of the film units are arranged in a separate stack. After exposure of the photosensitive sheet of a film unit, the exposed photosensitive sheet is superposed with a second sheet and the two sheets are moved between a pair of members for spreading a fluid processing reagent, carried in a container located between the sheets, in a thin layer therebetween. The photosensitive sheet of each film unit preferably comprises a photosensitive silver halide emulsion layer on a suitable support and the second sheet may merely aid in the spreading of the fluid processing reagent in a thin layer on the photosensitive sheet or, in a preferred form, serves as an image-receiving element or support for a positive photographic print formed by diffusion transfer-reversal. The container is preferably attached to the second sheet and contains one of the fluid reagents known to the art capable, when spread between a silver halide emulsion layer and a print-receiving layer, of producing a positive print by a silver transfer process.

In accordance with the present invention, the two sheets comprising a film unit are withdrawn from the camera as they are superposed and the fluid processing reagent is spread therebetween. To prevent exposure of the photosensitive sheet, the two sheets are opaque to actinic light and the layer of processing fluid is preferably quite viscous so that it adheres the two sheets in superposition until such time as processing is complete and they may be separated from one another. It may be desirable to include a dye or pigment in the fluid reagent for absorbing actinic light to further insure that light does not reach the emulsion layer following withdrawal of the sheets from the camera.

Reference is now made to Figs. 1 through 6 of the drawings wherein there is shown one form of camera embodying the invention. The camera, designated 10, comprises a rear housing section 12 including a rear wall 14, side walls 16 and 18, an intermediate wall 20 having a rectangular exposure aperture 22, an upper wall 24 and an intermediate upper wall 26. Rear wall 14, side walls 16 and 18, intermediate wall 20, and intermediate upper wall 26 cooperate to define a rear storage chamber 27 open at its lower end and adapted to contain a plurality of photosensitive sheets arranged in a stack with the foremost of the photosensitive sheets positioned for exposure against the rear surface of intermediate wall 20. The walls comprising rear housing section 12 are so arranged as to provide a recess 28, open at the front, between the side walls and the upper wall. A conventional view finder 32 may be provided in the upper portion of housing 12 in recess 28 adjacent upper wall 24.

The camera includes a forward housing section 34 comprising a forward wall 36, side walls 38, an inner or rear wall 40 and an upper end wall 42 inclined at an oblique angle with respect to forward wall 36. The walls of forward housing section 34 cooperate to define a storage chamber 44 adapted to contain a plurality of second sheets arranged in stacked relation. The forward housing section 34 is mounted within recess 28 of rear housing section 12 for pivotal movement about its lower end so that the lower end portions of intermediate wall 20 and rear wall 40 are located closely adjacent one another at least when section 34 is in folded or closed position within recess 28. Forward housing section 34 is pivotable from its folded position forwardly to an open or operative position (see Figs. 1 and 2) wherein it is disposed at an oblique angle with respect to rear housing section 12. Upper end wall 42 is preferably so arranged as to be located in a plane substantially parallel with intermediate wall 20 when the forward housing section is in open position, and means, such as a pair of folding linkages 46, may be provided for holding the forward housing section in its operative or open position.

The camera is provided with exposure means in the form of a lens 48 mounted in upper end wall 42 of forward housing section 34 with its axis substantially perpendicular to the plane of upper end wall 42 as well as the plane of intermediate wall 20 when the forward housing section is in open or operative position. In this position of the forward housing section, lens 48 is so located with respect to the rear surface of intermediate wall 20 that a photosensitive sheet, disposed against the surface of intermediate wall 20 across aperture 22, is in position for exposure substantially at the focal surface of the lens. A collapsible bellows 50 is provided, secured within recess 28 of rear housing section 12 and to forward housing section 34 to provide a dark chamber or path for light from the lens to a photosensitive sheet positioned for exposure against the rear surface of intermediate wall 20 in the rear housing section. The bellows is preferably of the type which folds inwardly with a single tuck so that when it is folded it does not extend laterally beyond side walls 28 and its folded thickness is maintained at a minimum whereby the lateral dimensions of the folded camera, together with the thickness dimensions of the folded camera, may be maintained at a minimum.

As previously indicated, the camera is intended to be employed with a plurality of film units each comprising a photosensitive sheet, a second sheet and a container of a fluid processing reagent, with the photosensitive sheets of the several film units arranged in a stack and the second sheets arranged in another stack. As a convenience for handling and storing the sheets and for preventing exposure of the photosensitive sheets, the two stacks of sheets are supplied in separate envelopes adapted to be loaded into the camera. Film units of this type, together with envelopes for enclosing and storing them, are shown in Figs. 2 and 7 through 11 of the drawings with the thicknesses of the materials being exaggerated for clarity of illustration. The film units comprise a plurality of photosensitive sheets 52, second sheets 54 and fluid-filled containers 56.

Each photosensitive sheet 52 comprises an elongated rectangular support sheet 58 having a folded leading end section 60 and mounting an exposure frame 61 comprising at least a photosensitive silver halide emulsion layer. The trailing end of each photosensitive sheet 52 comprises an extended tab or end section 62 of a thin sheet material whose function will be described hereinafter. A stack of photosensitive sheets 52 are provided in an envelope 64 comprising a forward wall 66 having a rectangular exposure aperture 68 generally coextensive with aperture 22 in intermediate wall 20. The stack of photosensitive sheets is positioned within the envelope with the exposure frames thereof underlying aperture 68 and with the folded end sections 60 extending through a slot in the end of the envelope. Envelope 64, containing a stack of photosensitive sheets 52, is adapted to be introduced into the camera into storage chamber 27 through the lower end of said chamber and positioned therein with forward wall 66 of the envelope located against the rear surface of intermediate wall 20 with exposure aperture 68 in alignment with exposure aperture 22 and with leading end section 60 extending downward from the envelope and chamber 27.

As a means for holding the foremost photosensitive sheet 52 of the stack in position for exposure against the rear surface of intermediate wall 20, there is provided a pressure plate 70, including suitable spring means 72, located behind the stack of photosensitive sheets for urging them forward against wall 66 of the envelope and intermediate wall 20 of the camera. The pressure plate and springs may be provided as shown within envelope 64; or, in an alternative form, for example, the springs and another suitable pressure plate may be provided as an element of the camera located within chamber 27 and mounted on rear wall 14. At least some form of pressure plate 70 is provided within the envelope and the end sections 62 are folded around the end of the pressure plate behind the latter and the rear wall of the envelope. This is done so that as the foremost photosensitive sheet is withdrawn from the envelope the remaining photosensitive sheets are frictionally retained by sections 62 within the envelope. In this way, sections 62 act in the nature of indexing means for insuring withdrawal of one photosensitive sheet at a time from the envelope.

As a means for sealing envelope 64 against the admission of light and thereby protecting photosensitive sheets 52 from exposure prior to and during introduction into the camera, there may be provided such means as a dark slide adapted to be withdrawn from the envelope after it has been positioned within the camera. In the form shown, this dark slide comprises a pair of light-opaque sheets 74 disposed to the front and rear of the stack of photosensitive sheets 52. One of sheets 74 is located in front of the foremost photosensitive sheet behind exposure aperture 68 and the other of sheets 74 is located behind the stack of the photosensitive sheets, preferably behind the pressure plate. Sheets 74 extend from the envelope on opposite sides of leading end sections 60 and are preferably joined to a single leader by which they may be withdrawn simultaneously from the envelope.

A stack of an equal number of second sheets 54 is enclosed in a second envelope, designated 76. Each of second sheets 54 comprises a support sheet 78 having a leading end section 78a, a trailing end section 79 of a substantially thin sheet material, and a print-receiving area 80 comprising a layer of material coextensive with exposure frame 61 and adapted to provide at least a support for a silver transfer print. A container 56 is attached to the leading end section 78a of each support sheet 78 adjacent an edge of print-receiving area 80.

Each container 56 is formed by folding a rectangular blank of fluid-impervious sheet material lengthwise and sealing the two sheets to one another at their margins to form a fluid-carrying cavity. The longitudinal marginal portions of the container are adapted to become unsealed in response to the application of compressive pressure to the walls of the container whereby its fluid contents are discharged substantially unidirectionally through the mouth provided by said portions. The container is secured to the second sheet with this discharge mouth directed toward the print-receiving area so that the fluid contents of the container can be discharged between the second and photosensitive sheets in the direction of the exposure frame and the print-receiving area.

Envelope 76 includes a forward wall 81 and rear wall 82 having a longitudinal slot 84, the purpose of which will become apparent, and an opening in one end through which the second sheets are movable. A pressure plate 86 is provided in envelope 76 in front of the stack of second sheets between the latter and forward wall 81 along with a spring 87 located between the pressure plate and forward wall 81 in the region of containers 56. Envelope 76 is tapered from a maximum thickness in the area of the leading ends of the second sheets and containers, necessitated by the added thickness of the containers, to a minimum thickness at the trailing end of the second sheets. Trailing end sections 79 of the second sheets are folded around and in front of the pressure plate between the latter and forward wall 81 so as to provide frictional means for assuring the withdrawal of only one second sheet at a time from the envelope. In the preferred form the two envelopes 64 and 76 are preferably joined at their respective forward wall 66 and rear wall 82 adjacent the leading ends of the photosensitive and second sheets whereby the admission of light between the envelopes at the leading ends of the sheets is prevented.

Envelope 76, containing a stack of second sheets 54, is adapted to be loaded into the camera into storage chamber 44 with rear wall 82 of the envelope located adjacent rear wall 40 of forward housing section 34. The second sheets are adapted to be moved, one at a time, downward from envelope 76 and are so positioned that the leading end section 78a of each second sheet engages the folding leading end section 60 of the foremost photosensitive sheet 52 so as to move the latter downward, whereby movement of each second sheet is effective to move both sheets in superposition from the camera.

Processing of each film unit is effected by moving a photosensitive and a second sheet in superposition, commencing at their leading ends, between a pair of pressure-applying members. In the preferred form of the camera shown, the pressure-applying members are mounted a fixed distance apart to provide a narrow, substantially fixed pressure-generating gap through which the two sheets comprising a film unit are advanced. The photosensitive and second sheets are preferably thicker in the region of their respective exposure frames and print-receiving areas than in the region of the container and their trailing ends. The thicknesses of the various materials are such that the combined thickness of the collapsed container and support sheets 58 and 78 (in the region of the container) does not exceed the combined thickness of the photosensitive and second sheets in the region of the exposure frames and print-receiving areas together with a layer of fluid of the desired thickness. It is by virtue of this particular construction that the film units may be moved through a substantially fixed gap for causing the fluid contents of the container, located between the sheets, to be discharged therefrom and spread in a uniformly thin layer of predetermined thickness between the exposure frame and print-receiving area. In order to insure spreading of the fluid processing reagent in a uniform layer of desired predetermined thickness over the entire exposure frame, the amount of fluid reagent provided is usually in excess of the amount required, and means are accordingly provided for trapping this excess fluid so that it does not collect on the pressure-applying members as the sheets are withdrawn through the gap between the members. This function is performed by the trailing end sections 62 and 79 of the sheets which, being appreciably thinner than the other portions of the film unit, are spaced apart, thereby providing a space in which any excess fluid is trapped and retained.

The pressure-applying means of the camera preferably comprises a unitary device mounted on rear housing section 12 and including a pair of pressure-applying members defining a substantially fixed pressure-generating gap. The device is movable between an operative position, wherein the pressure-applying members extend across the lower open end of chambers 27 and 44 forming a closed chamber, and an inoperative position, wherein said members are located to one side of the chambers 27 and 44, permitting introduction of a plurality of film units into the camera. This pressure-applying device, designated 154, comprises a pair of arms 156 pivotally mounted near their free ends on studs 158 secured in side walls 16 and 18 of rear housing section 12. The arms extend outside of the camera and are joined by a pair of pressure-applying members, designated 160 and 162, having parallel portions defining a narrow convergent pressure-generating gap 164 through which a pair of sheets comprising a film unit may be moved for spreading a fluid reagent in a thin layer therebetween. The particular construction of the pressure-applying members is not important so long as they are substantially rigid and include parallel convergent portions located a fixed predetermined distance apart to provide gap 164. In the form shown, for example, pressure-applying members 160 and 162 are formed of rigid sheet material, preferably sheet metal, by bending the material comprising the members back upon themselves to provide curved pressure-applying portions, designated 166 and 168 respectively, defining the sides of pressure-generating gap 164. In lieu of the construction shown, the pressure-applying members may comprise rigid members such as bars, rolls and the like. Arms 156 are adapted to contact side walls 16 and 18 of the camera casing and device 154 also includes relatively short front and rear connecting members 170 and 172 adapted, respectively, to engage the lower portion of forward wall 36 of housing section 34, when in closed position, and rear wall 14 of housing section 12 so as to restrict the entrance of light into the chamber 30 between device 154 and the walls of the two housing sections.

Pressure-applying device 154 is pivotable about studs 158 from an inoperative position, wherein pressure-applying members 160 and 162 are located to one side of the housing sections and, in the form shown, is pivotable toward the front of the camera to an operative position wherein members 160 and 162 extend across the lower ends of the storage chambers with pressure-generating gap 164 located substantially in the plane of movement of a film unit through the passage. The double thickness of folded leading end section 60 of photosensitive sheet 52, combined with the thickness of leading end section 78a of a second sheet 54, is less than the width of pressure-generating gap 164 so that the leading ends of the sheets comprising a film unit will readily pass through the gap.

The camera includes means for automatically feeding or moving the leading end of the rearmost second sheet of the film unit into and through chamber 30 between the pressure-applying members from the camera at least far enough to provide a leader by which the second sheet may be manually grasped. As the leading end of the rearmost second sheet is moved through chamber 30, it engages the folded leading end section of the foremost photosensitive sheet, moving the latter in superposition with the second sheet through the pressure-generating gap between the pressure-applying members from the camera. The automatic feeding of the sheets from the camera by an amount sufficient to provide a leader for the film unit is preferably effected in response to pivotal movement of forward housing section 34 rearward from its operative position into recess 28. Following folding of the camera, that is, pivotal movement of the forward housing section into operative position, a film unit comprising a photosensitive sheet and a second sheet may be withdrawn from the camera between the pressure-applying members by grasping the leading ends of the two sheets which have been fed through the pressure-generating gap in response to folding of the camera. In this regard, registration of the two sheets is assured since the leading edge of the second sheet engages the folded end section of the photosensitive sheet, and may be further assured by providing an adhesive material on the leading end sections of the two sheets adapted to adhere the leading end sections of the sheets together when they are superposed during passage through the pressure-generating gap. Suitable adhesive materials are those, well known in the art, which will readily adhere to themselves but not to other materials.

The automatic feeding means is adapted to engage the rearmost second sheet and move the sheet downward in response to pivotal movement of the forward housing section. In the form shown, this means comprises a pusher arm 176 mounted for sliding movement in the direction of its elongation on rear wall 40 of the forward housing section by such means as a pin 178 secured to wall 40 and engaged in a slot 180 in the arm. Arm 176 includes an enlarged lower end section 182 having a dependent engagement portion 184 which projects forwardly through a slot 186 provided in the lower portion of rear wall 40 substantially in alignment with slot 84 in envelope 76. Engagement portion 184 is adapted to engage the container 56 attached to the rearmost second sheet for moving the second sheet downward in response to downward sliding movement of pusher arm 176. Enlarged section 182 of arm 176 is adapted to ride on rear wall 40 on opposite sides of slot 186 and is provided with rearwardly curved lower end sections 188 adapted to ride up on ramplike members 190 located on opposite sides of the lower portion of slot 186 for withdrawing dependent engagement portion 184 from the slot and from engagement with the rearmost second sheet, whereby the latter may be withdrawn from the camera without danger of being scraped against dependent portion 184. Spring 87 and pressure plate 86 in envelope 76, containing the stack of second sheets, function to hold the second sheets against rear wall 40 in the region of slot 180 whereby engagement of dependent portion 184, with the container on the rearmost second sheet, is assured. Dependent engagement portion 184 is curved so that it will ride back over the container of the rearmost second sheet during return movement of pusher arm 176 upward to its original position and spring 87 is sufficiently weak so that the stack of second sheets will be displaced forwardly during the return movement of arm 176 and portion 184 without causing the rupture of any of the containers.

As a means for moving pusher arm 176 downward so as to feed the rearmost second sheet from the camera, there is provided a pivot arm 192 pivotally mounted intermediate its ends by a stud 194 on rear wall 40. An end section of pivot arm 192 is provided with an elongated slot 196 and pusher arm 176 is provided with a pin 198 slidably engaged in slot 196 so that pivotal movement of arm 192 about stud 194 is effective to impart a longitudinal sliding movement to arm 176. Thus, when arm 192 is rotated in a clockwise direction (viewing Fig. 3), pusher arm 176 is moved downward so as to feed the leading end of a film unit from the camera. A third arm, designated 200, is provided, pivotally mounted at one end on a shaft 202 within the rear housing section adjacent intermediate wall 20 and the lower edge of exposure aperture 22. A stud 203 is provided secured to the end of arm 192 for connecting the free end of arm 200 therewith. This free end of arm 200, being connected with pivot arm 192 during pivotal movement of the forward housing section, causes pivot arm 192 to be rotated in a clockwise direction, moving pusher arm 176 downward and causing the movement of the rearmost second sheet. Spring means may be provided for returning arms 176 and 192 back to their original positions when the forward housing section is again pivoted forwardly into operative position. In the embodiment of the feeding means shown, arm 200 is connected to the end of pivot arm 192 and functions to rotate the latter in both directions. In another embodiment, pivotal movement of the forward housing section may be effective to pivot arm 192 so as to move pusher arm 176 upward while at the same time tensioning a spring for moving arm 176 downward to move a second sheet from the camera. A latch means could be provided for retaining arm 176 in this upward displaced position against the tension of the spring means until such time as the arm is released for movement, for example immediately after exposure of the foremost photosensitive sheet and in response to actuation of the exposure means or pivotal movement of the forward housing section.

As a general rule, conventional shutter mechanisms, which are associated with a lens and which include rotary elements such as blades for obturating the lens aperture, are constructed so that these rotary elements pivot about axes substantially parallel with the optical axis of the lens. For this reason, the larger dimensions of the shutter lie in planes perpendicular to the pivotal axes of the shutter elements, that is, in the planes of rotation of the shutter elements. Usually when a shutter of this type is incorporated into a folding camera of the type wherein the lens and shutter assembly is mounted on a section of the camera which is movable with respect to another section containing the photosensitive material, there is associated with the camera an expensive and often complicated erecting mechanism which maintains the shutter erect when the camera is both open and folded and for accurately positioning the shutter and lens with respect to the photosensitive material. By maintaining the shutter in an erect position, that is, with the pivotal axes of the rotary shutter elements perpendicular to the focal surface of the camera when the camera is folded, the thickness of the camera is at a minimum. Thus, a camera of this type not only requires an erecting mechanism which is eliminated by the construction of the invention but also requires a more expensive four-sided bellows which will not fold as completely as the three-sided bellows of the camera disclosed. Cameras have been proposed wherein the lens and shutter mechanism is mounted on a pivotable section of the camera housing. However, when the rotary elements of the shutter are mounted for rotation about axes parallel to the lens axes, the camera, when folded, is considerably thicker than that of the invention since the shutter in the folded position of the camera is disposed with its greater dimensions, that is, its length and width (or diameter), positioned obliquely or even perpendicularly to the focal surface of the camera, since the lens axes and pivotal axes of the shutter elements are located either parallel with or at an acute angle to the focal surface of the camera.

By virtue of a novel shutter construction, the camera of the present invention, when folded, is thinner and more compact than most conventional cameras since the axes of the rotary elements of the shutter are disposed substantially perpendicularly to the focal surface of the camera, with the result that the major dimensions of the shutter lie in a plane generally parallel to this focal surface (and major dimensions) of the camera. When the camera is folded, the lens is positioned with its axis at an acute angle to the focal surface of the rear section of the camera so that the thickness of the folded camera is attributable in large part to the diameter of the lens and the thicknesses of the stacks of sheet materials, rather than to the dimensions of the shutter assembly.

Figure 3:
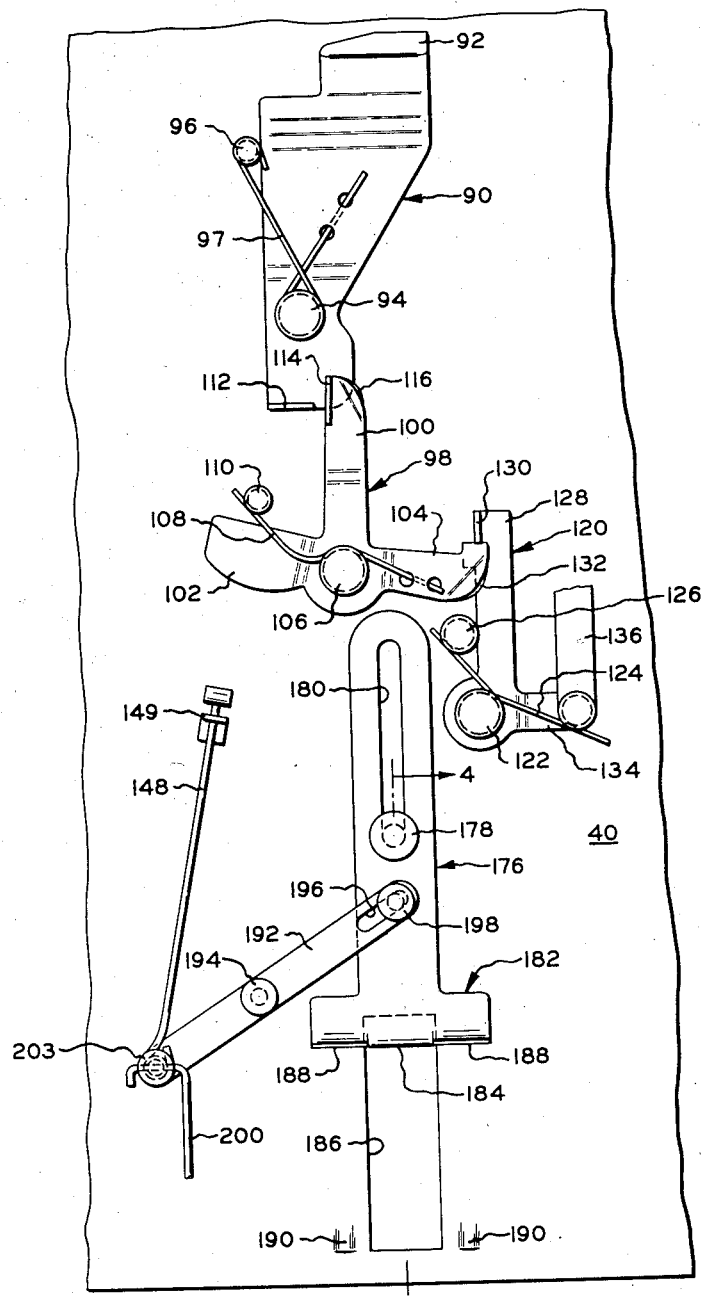
Fig. 3 is a plan view of a portion of the mechanism of the camera.
Figure 4:
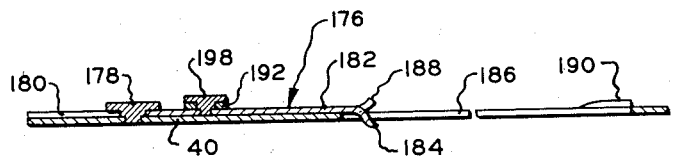
Fig. 4 is a sectional view, taken along the line 4—4 of Fig. 3.
Figure 5:
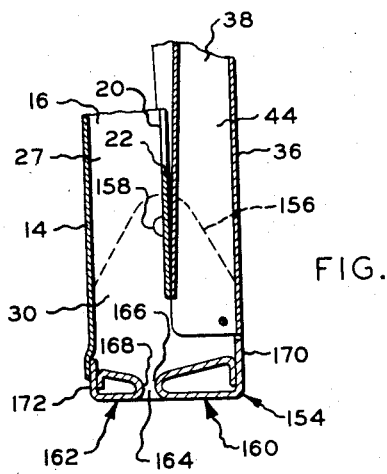
Fig. 5 is a fragmentary sectional view of a portion of the camera.
Figure 6:
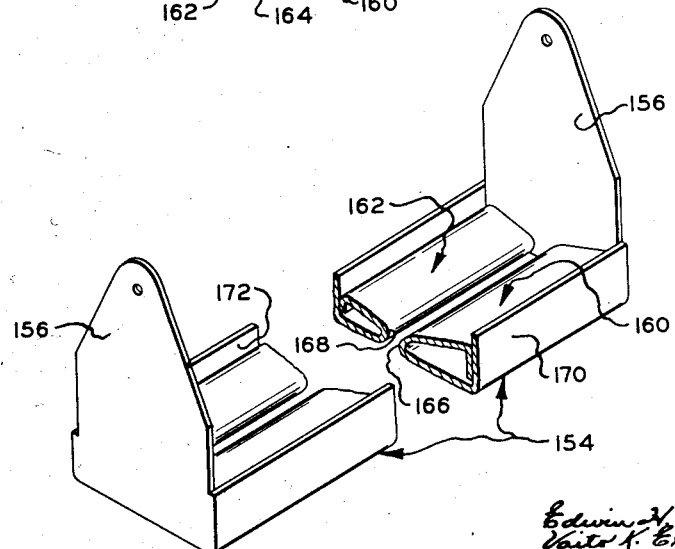
Fig. 6 is a perspective view of one component of the camera.
Figure 7:
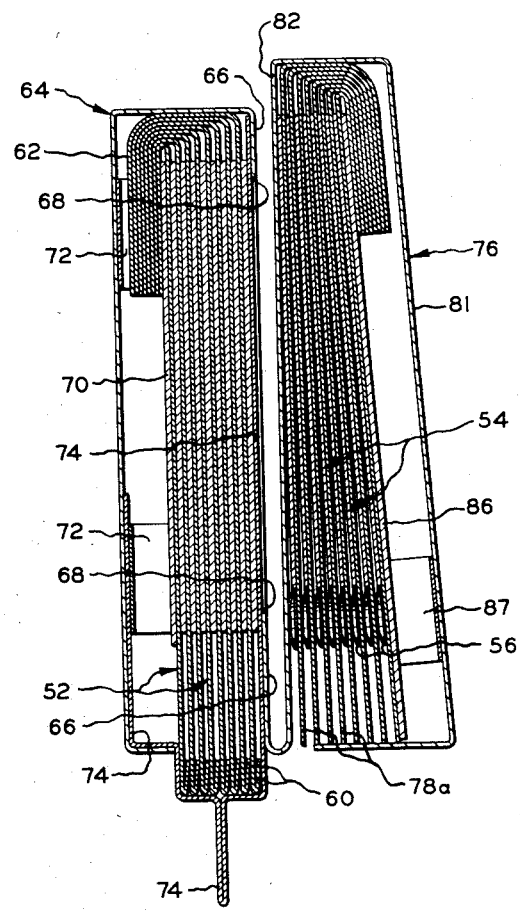
Fig. 7 is a sectional view of a film pack assemblage adapted to be employed in the camera, the thicknesses of the materials being exaggerated for purposes of clarity of illustration.

A photographic shutter of this foregoing type, and suitable for incorporation into the herein-disclosed camera, is illustrated in Figs. 1 and 3 of the drawings. The components of the shutter mechanism are mounted on the rear or inside of rear wall 40 of forward housing section 34 and are substantially flat, with the exception of the member which obturates the lens aperture, resulting in a shutter mechanism which is comparatively thin. An additional saving in space is realized by mounting the shutter components on a wall of the camera housing rather than on a separate wall comprising the shutter housing and by leaving the shutter components unenclosed, that is, open to the inside of the camera. The shutter components and the interior surface of wall 36, as well as all other interior surfaces of the camera, should be nonreflecting and light absorbing and accordingly are provided with at least a nonreflecting and light-absorbing finish so that no light from lens 48 is reflected from the camera components to the photosensitive sheet.

The shutter comprises a substantially flat aperture-covering blade 90 having an upstanding end section 92 at one end. Blade 90 is pivotally mounted intermediate its ends on a stud 94 so that, in its normal position of rest or aperture-covering position, end section 92 extends upward at an angle across the aperture of lens 48. The major portion of blade 90 is located in a plane parallel to wall 40 and end section 92 extends upward at an angle therefrom substantially parallel with upper end wall 42. End section 92 may be enlarged or weighted so as to add momentum to the movement of the blade. A stud 96 or other suitable means is provided adjacent one edge of blade 90 to form a limit stop at the aperture-covering position of the blade and a torsion spring 97, secured intermediate its ends to stud 94 and at its ends to stud 96 and blade 90, is provided for urging the blade in a counterclockwise direction (viewing Fig. 3) into aperture-covering position against the stud 96. Means are provided for pivoting blade 90 in a clockwise direction so as to uncover the aperture of lens 48 and in the form shown comprise an actuating element 98 having three arms designated kicker arm 100, cocking arm 102 and latch arm 104 pivotally mounted at the intersection of said arms on a stud 106. A relatively strong torsion spring 108 is provided secured intermediate its ends to stud 106 and at its ends to latch arm 104 and a stud 110 located between arms 100 and 102. Spring 108 urges actuating element 98 in a clockwise direction toward stud 110, the latter being adapted to act as a limit stop for element 98.

Actuating element 98 is mounted so that the end of kicker arm 100 will overlap or intersect the end of blade 90 which is opposite end section 92. During cocking of the shutter in preparation for release and actuation, the end of kicker arm 100 is pivoted from a position on one side of the end of blade 90 in a clockwise direction across the end of this blade to the opposite side thereof. The end of the blade is provided with an upturned engagement portion 112 which tapers toward the left. The end of kicker arm 100 includes an upturned end portion 114 on its left edge adapted to engage upturned portion 112 during counterclockwise rotation of element 98 and its right-hand corner portion 116 is bent slightly away from wall 40 so that, during clockwise rotation of element 98, the end of arm 100 will engage, deflect and ride over the upturned portion 112 of the end of blade 90. Both blades are preferably resilient so that each will deflect to the extent necessary to allow arm 100 to pass over the end of blade 90 and portion 112. When the shutter is released, element 98 pivots in a counterclockwise direction under the bias of spring 108 so that upturned end portion 114 on the end of kicker arm 100 engages upturned portion 112 on the end of blade 90, imparting an aperture-uncovering clockwise rotation to the blade which will return in a counterclockwise direction to its aperture-covering position under the bias of spring 97.

Release means are provided for retaining element 98 in its cocked position with the end of arm 100 positioned to one side of upturned portion 112 on the end of blade 90. This release means comprises a generally L-shaped release lever 120 pivotally mounted on stud 122 and a torsion spring 124 coiled at its medial portion around stud 122 and secured at one end to lever 120 and at its other end to stud 126 for urging lever 120 in a clockwise direction into latching position against stud 126, the latter acting as a limit stop for movement of the lever. Lever 120 includes a latch arm 128 extending generally perpendicular to arm 104 of actuating element 98 and including an end section extending toward arm 104 having an upturned engagement portion 130 at its ends which is tapered away from stud 122. Engagement portion 130 is provided for engaging the end of latch arm 104 of element 98 for retaining the latter against counterclockwise movement when element 98 is in cocked position.

Element 98 is released by clockwise movement of lever 120 whereby portion 130 is disengaged from arm 104. Since the shutter is cocked by clockwise movement of actuating element 98, means are provided whereby the end of arm 104 may be moved past and in engagement with the end of arm 128 including engagement portion 130. For this purpose there is provided a corner portion 132 at the end of arm 104 which is upturned slightly so that arm 104 will ride up and over the end of arm 128 and portion 130 during clockwise movement of arm 104, both arms being resilient so that they may be readily deflected sufficiently for this purpose. Release lever 120 includes a second arm 134 extending at a right angle from arm 128. An elongated member 136 comprising a component of a manually operable release linkage is mounted for axial sliding movement on wall 36 and is coupled at one end to the end of arm 134 so as to pivot the latter for releasing the shutter for operation. The manually operable release linkage comprises an elongated rod 138 mounted for axial movement in an enlarged portion 140 of side wall 16. The upper end of rod 138 projects above upper wall 24 where it may be manually engaged and the lower end of the rod extends into the lower end of the camera where it engages one arm of a crank member (not shown) having another arm connected through a suitable linkage to member 136.

Cocking of the shutter, i.e., counterclockwise rotation of actuating element 98, may be effected substantially automatically by closing or pivoting forward housing section 34 rearwardly in a counterclockwise direction (viewing Fig. 1 into recess 28. This may be effected by an arm similar to arm 200, or, in the preferred form shown, by a rod 148 connected at one end to stud 203 which joins the rod with arm 200 and mounted for sliding movement intermediate its ends in a guide 149 mounted on wall 40. Rod 148 is so positioned that its free end will engage cocking arm 102 of actuating element 98 and push upwardly on the latter to rotate the element during pivotal movement of forward housing section 34 into closed position.

The herein-disclosed camera can be readily loaded and easily operated and is comparatively compact, especially in view of the fact that the operation of the camera, including feeding the sheets and cocking the shutter, is almost totally automatic and the camera is capable of storing sufficient sheet materials to make several photographic prints. The camera is loaded in its forward position with forward housing section 34 located within recess 28 in rear section 12 and with pressure-applying device 154 pivoted to a forward position leaving chambers 27 and 44 unobstructed. Connected envelopes 64 and 76, containing several, for example eight, photosensitive and second sheets respectively, are introduced together into the camera with envelope 64, containing a stack of photosensitive sheets 52, entering chamber 27 behind intermediate wall 20 and envelope 76, containing a stack of second sheets 54, entering chamber 44 in front of rear wall 40. Opaque sheets 74 may then be withdrawn from envelope 64 and pressure-applying device 154 pivoted into operative position. Or, if desired, the pressure-applying device may be pivoted into operative position and, as this is being done, the leader attached to opaque sheet 74 may be threaded through gap 164 between pressure-applying members 160 and 162 so that the opaque sheets can be withdrawn after the pressure-applying device is in operative position.

The camera is operated by pivoting forward housing section 34 forward into operative position whereby lens 48 is located in position for exposure relative to the foremost photosensitive sheet located against the rear surface of intermediate wall 20 across the exposure aperture 22 and pusher arm 176 is allowed to move upward into position to engage the rearmost second sheet. Following exposure, the forward housing section is pivoted rearwardly to its folded position within recess 28 whereby the shutter is automatically cocked for the next exposure and the leading end section 78a of the rearmost second sheet 54 is moved downwardly into engagement with the folded leading end section 60 of the foremost photosensitive sheet 52 within chamber 30 and the two leading end sections are moved in superposition through pressure-generating gap 164 between pressure-applying members 160 and 162 from the camera. The leader thus provided by the leading end sections of the two sheets comprising a film unit may be grasped and the film unit manually withdrawn from the camera for spreading the fluid processing composition, carried in a container associated with the second sheet and located between the sheets, in a thin layer between the exposed exposure frame of the photosensitive sheet and the print-receiving area of the second sheet. The camera is ready to make another exposure when the forward housing section is again pivoted forward into operative position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising, in combination, a first casing section providing a first chamber adapted to contain a plurality of film units arranged in stacked relation, means within said chamber for locating the foremost of said film units in position for exposure, a second casing section pivotally secured at one end to said first casing section adjacent one end of the latter, said second casing section providing a second chamber adapted to contain a plurality of sheets arranged in stacked relation, said casing sections being pivotable with respect to one another between a first position and a second position wherein said casing sections are located at an acute angle with respect to one another, means mounted on said second casing section for exposing said foremost film unit, a folding bellows secured between and connecting said first and second casing sections to provide an exposure chamber therebetween when said casing sections are in said second position, means providing a passage at said one end of said sections communicating with said first and second chambers, and means mounted on said second casing section and coupled with said first casing section for moving one of said sheets through said passage into engagement with said foremost film unit and for moving said one sheet and said foremost film unit through said passage in response to pivotal movement of said casing sections from one of said first and second positions to the other.

2. The photographic apparatus of claim 1 wherein said means for moving said one sheet and said foremost film unit from their respective chambers through said passage is responsive to pivotal movement of said casing sections from said second position to said first position.

3. The photographic apparatus of claim 1 wherein said means within said first chamber for locating said foremost film unit in position for exposure comprise components of a film pack assemblage including an envelope containing said film units and positioned within said first chamber.

4. Photographic apparatus as described in claim 1 adapted to be employed with a plurality of film units each including a photosensitive sheet and having a folded end section arranged in stacked relation with said folded end sections projecting from said first chamber into said passage, and wherein said means for advancing said film units and said sheets includes means projecting into said second chamber into engagement with one of said sheets for moving an end portion of said one sheet from said second chamber into said passage into engagement with said folded end section of said foremost film unit and for moving both said film unit and said one sheet through said passage from said apparatus to provide a leader whereby said film unit and said one sheet may be manually grasped for withdrawing them from said apparatus.

5. The photographic apparatus of claim 4 comprising means associated with said passage and providing a pressure-generating gap for superposing said foremost film unit and said one sheet and distributing a fluid processing reagent therebetween during withdrawal movement of said foremost film unit and said one sheet through said gap, and wherein said means for advancing said foremost film unit and said one sheet is adapted to advance the folded end section of said foremost film unit and said end portion of said one sheet in superposition through said gap.

6. The photographic apparatus of claim 1 wherein said means for advancing said foremost film unit and said one sheet comprises an engagement member mounted for reciprocating movement and having a portion projecting into said second chamber into engagement with said one sheet and an actuating member coupled with said first casing section and said engagement member for moving said engagement member so as to feed said one sheet from said second chamber through said passage in response to pivotal movement of said casing sections relative to one another from one of said first and second positions to the other.

7. Photographic apparatus for use with a plurality of photographic film units each comprising a photosensitive sheet having a folded leading end section and a second sheet, said apparatus comprising, in combination, a first casing section having front and rear walls providing therebetween a first chamber adapted to contain a plurality of said photosensitive sheets arranged in stacked relation with the folded leading end sections thereof extending from one end of said chamber, said front wall having an exposure aperture, means within said first chamber for locating the foremost of said photosensitive sheets in position for exposure against said forward wall across said exposure aperture, a second casing section having front and rear walls providing a second chamber adapted to contain a plurality of said second sheets arranged in stacked relation, said second casing section being pivotally mounted at one end on said first casing section adjacent said one end of the latter, said casing sections being pivotable with respect to one another between a first position, wherein said forward wall of said first section and said rear wall of said second section are located adjacent one another, and a second position, wherein the last-mentioned walls are located apart from one another at an acute angle, a folding bellows secured to and connecting said first and second casing sections for providing an exposure chamber between said sections when they are in said second position, means mounted on said second casing section for exposing said foremost photosensitive sheet positioned for exposure across said aperture within said first chamber, means providing a passage at said one ends of said casing sections communicating with said first and second chambers, and sheet-advancing means for moving the leading end sections of a photosensitive sheet and a second sheet comprising a film unit through said passage from said apparatus, said sheet-advancing means comprising an engagement member for engaging and moving the second sheet positioned adjacent said rear wall of said second casing section from said second chamber into said passage into engagement with the folded leading end section of said foremost photosensitive sheet and both said sheets, in superposition, from said apparatus in response to pivotal movement of said casing sections from one of said first and second positions to the other.

8. The photographic apparatus of claim 7 wherein said sheet-advancing means is responsive to pivotal movement of said casing sections from said second to said first position for moving said sheets through said passage.

9. The photographic apparatus of claim 7 wherein said means for locating the foremost of said photosensitive sheets in position for exposure against said forward wall of said rear casing section comprise components of a film pack assemblage including an envelope containing said photosensitive sheets and positioned within said first chamber.

10. The photographic apparatus of claim 7 comprising means associated with said passage and providing a pressure-generating gap for superposing said sheets and distributing a fluid processing reagent therebetween during withdrawal movement of said sheets through said gap, and wherein said sheet-advancing means is adapted to advance said folded end section of said foremost photosensitive sheet and the leading end section of said one of said second sheets in superposition through said gap.

11. The photographic apparatus of claim 7 wherein said engagement member is mounted for reciprocating movement on said rear wall of said second casing section exterior of said second chamber and includes a portion projecting into said second chamber through a slot in the last-mentioned rear wall and said sheet-advancing means includes an actuating means coupled with said first casing section and said engagement member for moving said engagement member so as to feed said one second sheet into and through said passage in response to pivotal movement of said casing sections relative to one another.

12. The photographic apparatus of claim 11 wherein said actuating means comprises a pivotal member mounted for pivotal movement intermediate its ends on said rear wall of said second casing section and connected adjacent one end to said engagement member and a connecting member pivotally mounted at one end on said first casing section and connected at its other end to the other end of said pivotal member for pivoting the latter in response to pivotal movement of said casing sections relative to one another.

13. The photographic apparatus of claim 11 wherein said sheet-advancing means includes means on said rear wall of said second casing section for moving said engagement member toward the last-mentioned rear wall so as to withdraw said portion from engagement with said one second sheet during movement of said engagement member in a direction for moving said sheets.

14. Photographic apparatus for use with a plurality of photographic film units each comprising a photosensitive sheet having a folded leading end section, a second sheet and a container of a fluid processing reagent associated with one of said sheets, said apparatus comprising, in combination, a first casing section having front and rear walls providing therebetween a first chamber adapted to contain a plurality of said photosensitive sheets arranged in stacked relation with the foremost photosensitive sheet disposed against said front wall and with the folded leading end sections of said photosensitive sheets extending from one end of said chamber, said front wall having an exposure aperture, means within said first chamber for urging said photosensitive sheets forward against said forward wall so as to locate said foremost photosensitive sheet across said aperture in position for exposure, a second casing section having front and rear walls defining a second chamber adapted to contain a plurality of said second sheets arranged in stacked relation, said casing sections being pivotable with respect to one aonther between a first position, wherein said forward wall of said first section and said rear wall of said second section are located adjacent one another, and a second position, wherein the last-mentioned walls are located apart from one another at an acute angle, means mounted on said second casing section for exposing said foremost photosensitive sheet positioned for exposure within said first chamber across said aperture, a folding bellows secured between and connecting said first and second casing sections and providing an exposure chamber therebetween when said casing sections are in said second position, means providing a passage at said one end of said first casing section communicating with said first and second chambers, means associated with said passage for providing a pressure-generating gap through which a photosensitive and second sheet comprising a film unit may be withdrawn from said apparatus for superposing said sheets and distributing a fluid processing reagent between said sheets, and sheet-advancing means for moving the leading end sections of a photosensitive sheet and a second sheet comprising a film unit through said passage and said pressure-generating gap from said apparatus, said sheet-advancing means comprising engagement means mounted for reciprocal movement on said rear wall of said second casing section and projecting into said second chamber and into engagement with the rearmost second sheet located against the last-mentioned rear wall for moving the leading end section of said second sheet from said second chamber into said passage into engagement with the folded leading end section of said foremost photosensitive sheet and moving both said leading end sections through said pressure-generating gap, and means coupled with said engagement means and said first casing section and responsive to pivotal movement of said casing sections from one of said first and second positions to the other for moving said engagement means so as to advance the leading end sections of a photosensitive sheet and second sheet comprising a film unit in superposition through said pressure-generating gap.

15. Photographic apparatus as described in claim 14 for use with film units wherein said containers are attached to said second sheets, said engagement means being mounted on said rear wall of said second casing section exterior of said second chamber, the last-mentioned rear wall having a slot and said engagement means including a portion projecting through said slot for engaging the container attached to said rearmost second sheet.

16. The photographic apparatus of claim 15 including resilient means within said second chamber for urging said second sheets at least in the regions of said containers toward said rear wall of said second casing section.

17. Photographic apparatus comprising, in combination, a film pack assemblage including a first envelope having a forward wall, an aperture in said forward wall and an opening in one end through which a photosensitive sheet is movable, a plurality of photosensitive sheets arranged in stacked relation within said first envelope, means for retaining the foremost of said photosensitive sheets located adjacent said forward wall in position for exposure against said forward wall across said exposure aperture, a second envelope having forward and rear walls, a slot in said rear wall and an opening in one end through which a second sheet is movable, and a plurality of second sheets arranged in stacked relation within said second envelope, a first casing section including means mounting said first envelope with said foremost photosensitive sheet in position for exposure, a second casing section including means containing said second envelope, said second casing section being mounted for pivotal movement on said first casing section adjacent said one ends of said envelopes, said casing sections being pivotable with respect to one another between a first position and a second position wherein said casing sections are located at an acute angle with respect to one another, means mounted on said second casing section for exposing said foremost photosensitive sheet, a folding bellows secured between and connecting said first and second casing sections and providing an exposure chamber therebetween when said casing sections are in said second position, means providing a passage at the ends of said casing sections where said sections are joined and communicating with said openings in said first and second envelopes, and means responsive to pivotal movement of said casing sections from one of said first and second positions to the other for engaging said foremost photosensitive sheet and said rearmost second sheet and moving end portions of the last-mentioned sheets into superposition within said passage and through said passage from said apparatus.

18. Photographic apparatus comprising, in combination, a film pack assemblage including a first envelope having a forward wall, an aperture in said forward wall and an opening in one end through which a photosensitive sheet is movable, a plurality of photosensitive sheets arranged in stacked relation within said first container with the foremost of said sheets disposed against said forward wall, means for retaining the foremost photosensitive sheet in position for exposure against said forward wall across said exposure aperture, a second envelope having forward and rear walls and a slot in said rear wall and an opening through which a second sheet is movable, and a plurality of second sheets arranged in stacked relation within said second envelope with the rearmost of said second sheets disposed against said rear wall of said second envelope, a first casing section having front and rear walls providing therebetween a first chamber containing said first envelope, an exposure aperture in said forward wall of said first casing section substantially coextensive with said exposure aperture in said forward wall of said first envelope, a second casing section having front and rear walls providing a second chamber containing said second envelope, said rear walls of said second envelope and said second casing section having aligned slots, said second casing section being pivotally mounted at one end on said first casing section adjacent one end of the latter, said casing sections being pivotable with respect to one another between a first position, wherein said forward wall of said first section and said rear wall of said second section are located adjacent and generally parallel with one another, and a second position, wherein the last-mentioned walls are located apart from one another at an acute angle, a folding bellows secured between and connecting said first and second casing sections for providing an exposure chamber between said sections when said sections are located in said second position, means mounted on said second casing section for exposing said foremost photosensitive sheet positioned within said first envelope and said first chamber, means providing a passage at said one ends of said casing sections communicating with said first and second chambers, and sheet-advancing means mounted on said second casing section and coupled with said first casing section for moving said rearmost second sheet and said foremost photosensitive sheet through said passage from their respective chambers and envelopes in response to pivotal movement of said casing sections from one of said first and second positions to the other.

19. The photographic apparatus of claim 18 wherein said photosensitive sheets each include a folded end section and said photosensitive sheets are arranged in stacked relation within said first envelope with said folded end sections projecting from said first envelope through said opening into said passage, and wherein said sheet-advancing means includes means projecting into said second envelope through said slots in said rear walls of said second envelope and second casing section for engaging and moving an end portion of said rearmost second sheet from said second envelope into said passage and into engagement with said folded end section of said foremost photosensitive sheet to move both sheets through said passage from said apparatus and provide a leader whereby said sheets may be manually grasped for withdrawing them from said apparatus.

20. The photographic apparatus of claim 18 comprising means associated with said passage and providing a pressure-generating gap for superposing said sheets and distributing a fluid processing reagent therebetween during withdrawal movement of said sheets through said gap, and wherein said sheet-advancing means is adapted to move said folded end section of said foremost photosensitive sheet and said one end section of said rearmost second sheet in superposition through said gap.

21. The photographic apparatus of claim 18 wherein said sheet-advancing means is responsive to pivotal movement of said casing sections from said second to said first position for moving said sheets through said passage.

22. The photographic apparatus of claim 18 wherein said sheet-advancing means comprises an engagement member mounted for reciprocating movement on said rear wall of said second casing section and having a portion projecting through said slots into engagement with said rearmost second sheet located within said second envelope, and actuating means coupled with said first casing section and said engagement member for moving said engagement member so as to feed said rearmost second sheet from said second envelope through said passage in response to pivotal movement of said casing sections relative to one another.

23. The photographic apparatus of claim 22 wherein said sheet-advancing means includes means on said rear wall of said second casing section for moving said engagement member toward said first casing section so as to withdraw said portion from engagement with said rearmost second sheet during sheet-advancing movement of said engagement member.

24. A camera comprising, in combination, a housing defining a chamber within which photosensitive sheets are adapted to be exposed, exposure means mounted on said housing, said housing including a first casing section providing a first chamber adapted to contain a plurality of photosensitive sheets arranged in stacked relation, a second casing section secured at one end to said first casing section adjacent one end of the latter, said second casing section providing a second chamber adapted to contain a plurality of second sheets arranged in stacked relation, means within said first chamber for locating one of said photosensitive sheets in position for exposure, said casing sections being pivotable with respect to one another between a first position and a second position wherein said casing sections are located at an angle with respect to one another, means providing a passage at one end of casing sections communicating with said first and second chambers, and means mounted on said second casing section and coupled with said first casing section for moving one of said second sheets from said second chamber into said passage into engagement with a portion of said one photosensitive sheet and for moving said one second sheet and said one photosensitive sheet in engagement with one another through said passage in response to pivotal movement of said casing sections from one of said first and second positions to the other.

25. Photographic apparatus comprising, in combination, a first casing section providing a first chamber, adapted to contain a plurality of photosensitive sheets in stacked relation, means within said chamber for locating one of said photosensitive sheets in position for exposure, a second casing section pivotably secured to said first casing section, said second casing section providing a second chamber adapted to contain a plurality of second sheets arranged in stacked relation, said casing sections being pivotable with respect to one another between a first position and a second position wherein said casing sections are located at an angle with respect to one another, means mounted on said second casing section for exposing said photosensitive sheet, a bellows secured between and connecting said first and second casing sections to provide an exposure chamber therebetween when said casing sections are in said second position, means providing a passage at one end of said sections communicating with said first and said second chambers, and means mounted on one of said casing sections and coupled with the other of said casing sections for moving one of said second sheets and said one photosensitive sheet through said passage into engagement with the other of said one second sheet and said one photosensitive sheet and for moving said one second sheet and said one photosensitive sheet in engagement with one another through said passage in response to pivotable movement of said casing sections from one of said first and second positions to the other.

26. The photographic apparatus of claim 25 wherein said means for moving said sheets from their respective chambers through said passage is responsive to pivotal movement of said casing sections from said second position to said first position.

27. Photographic apparatus comprising, in combination a first casing section providing a first chamber adapted to contain a plurality of photosensitive sheets arranged in stacked relation, means within said chamber for locating one of said photosensitive sheets in position for exposure, a second casing section pivotally secured to said first casing section, said second casing section providing a second chamber adapted to contain a plurality of second sheets arranged in stacked relation, said casing sections being pivotable with respect to one another between a first position and a second position wherein said casing sections are located at an angle with respect to one another, means mounted on said second casing section for exposing said one photosensitive sheet, a bellows secured between and connecting said first and second casing sections to provide an exposure chamber therebetween when said casing sections are in said second position, means providing a passage at one end of said sections communicating with said first and second chambers, means mounted on said second casing section and coupled with said first casing section for moving one of said second sheets through said passage from said second chamber into said passage into engagement with a portion of said one photosensitive sheet and for moving said one second sheet and said one photosensitive sheet in engagement with one another through said passage in response to pivotal movement of said casing sections from one of said first and second positions to the other.

28. Photographic apparatus as described in claim 27 adapted to be employed with a plurality of photosensitive sheets, each having a folded end section arranged in stacked relation with said folded end portions projecting from said first chamber into said passage, and wherein said means for moving said sheets through said passage includes means projecting into said second chamber into engagement with said one second sheet for moving an end portion of said one second sheet from said second chamber into said passage into engagement with said folded end portion of said one photosensitive sheet, and for moving said one photosensitive and said one second sheet through said passage from said apparatus to provide a leader whereby said one photosensitive sheet and said one second sheet can be manually grasped for withdrawing them from said apparatus.

29. The photographic apparatus of claim 27 wherein said apparatus includes means providing a pressure-generating gap associated with said passage for superposing said one photosensitive sheet and said one second sheet and distributing a fluid processing composition between said superposed sheets during withdrawal movement of said superposed sheets from said passage through said gap, and said means for advancing said one photosensitive sheet and said one second sheet is responsive to relative movement of said casing sections for advancing said end portions of said one photosensitive sheet and said one second sheet into superposition and through said gap.

30. The photographic apparatus of claim 27 wherein said means for advancing said one photosensitive sheet and said one second sheet comprises an engagement member mounted for reciprocating movement on said second casing section and having a portion projecting into said second chamber into engagement with said one second sheet, and an actuating member coupled with said first casing section and said engagement member for moving said engagement member so as to engage and feed said one second sheet from said chamber through said passage in response to pivotal movement of said casing sections relative to one another from one of said first and second positions to the other.

References Cited in the file of this patent

UNITED STATES PATENTS

| | | |
|---|---|---|
| 1,184,110 | Linder | May 23, 1916 |
| 2,435,720 | Land | Feb. 10, 1948 |

FOREIGN PATENTS

| | | |
|---|---|---|
| 24,350 | Great Britain | Nov. 29, 1901 |